(12) United States Patent
Chen

(10) Patent No.: US 7,631,221 B2
(45) Date of Patent: Dec. 8, 2009

(54) METHOD FOR IDENTIFYING POWER SUPPLY MODULES

(75) Inventor: Tsung-Chun Chen, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 510 days.

(21) Appl. No.: 11/360,499

(22) Filed: Feb. 24, 2006

(65) Prior Publication Data

US 2007/0220325 A1    Sep. 20, 2007

(51) Int. Cl.
*G06F 11/00* (2006.01)

(52) U.S. Cl. ............................................. 714/22

(58) Field of Classification Search ............... 714/14, 714/22; 713/340
See application file for complete search history.

(56) References Cited

U.S. PATENT DOCUMENTS

| | | | | |
|---|---|---|---|---|
| 5,410,713 A | * | 4/1995 | White et al. ............... | 713/330 |
| 5,475,295 A | * | 12/1995 | Hong ....................... | 340/636.15 |
| 5,481,730 A | * | 1/1996 | Brown et al. ............. | 713/340 |
| 5,842,030 A | * | 11/1998 | Larabell et al. ........... | 713/340 |
| 6,084,523 A | * | 7/2000 | Gelnovatch et al. ..... | 340/636.1 |
| 6,115,822 A | * | 9/2000 | Kim et al. ................ | 713/310 |
| 6,289,467 B1 | * | 9/2001 | Lewis et al. ............. | 713/340 |
| 6,832,324 B2 | * | 12/2004 | Mullins et al. ........... | 713/300 |
| 7,010,589 B2 | * | 3/2006 | Ewing et al. ............. | 709/223 |
| 7,099,934 B1 | * | 8/2006 | Ewing et al. ............. | 709/223 |
| 7,171,461 B2 | * | 1/2007 | Ewing et al. ............. | 709/223 |
| 7,199,489 B2 | * | 4/2007 | Gottlieb et al. .......... | 307/66 |
| 2002/0147733 A1 | * | 10/2002 | Gold et al. ............... | 707/200 |
| 2004/0151304 A1 | * | 8/2004 | George et al. ........... | 379/413 |

* cited by examiner

*Primary Examiner*—Michael C Maskulinski
*Assistant Examiner*—Amine Riad
(74) *Attorney, Agent, or Firm*—Muncy, Geissler, Olds & Lowe, PLLC

(57) ABSTRACT

A method for identifying power supply modules is adopted for use on a backup-type power supply system that includes real power supply modules and a dummy power supply module structured in a N+1 architecture to output power. By altering PG signal issue time and identifying PG signal delivery time difference of different power supply modules, the real power supply modules and the dummy power supply module can be identified. Thus operators can clearly understand coupling and installation conditions of the power supply modules of the backup-type power supply system to facilitate power risk management.

13 Claims, 2 Drawing Sheets

METHOD FOR IDENTIFYING POWER SUPPLY MODULES

FIELD OF THE INVENTION

The present invention relates to a method for identifying power supply modules and particularly for a method to identify installation conditions of a real power supply module and a dummy power supply module in a backup-type power supply system that adopts a N+1 architecture to output power.

BACKGROUND OF THE INVENTION

The conventional backup-type power supply system generally includes a plurality of power supply modules formed in a N+1 architecture. Takes 1+1 architecture as an example, it includes two power supply modules. It means that it allows malfunction occurred to one power supply module while another power supply module still maintains normal supply of power. In such a backup-type power supply system the power supply modules share a common structure. In other words, a plurality of power supply modules share a common chassis and a controlling power integration back panel. In practice, if a higher safety power factor is not considered (such as the power consumption at the rear end electronic device is lower), a real power supply module and a dummy power supply module could commonly share a same structure. For instance, on the 1+1 architecture, only one real power supply module is installed, while a dummy power supply module is installed on another space. The dummy power supply module usually cannot supply power. Due to the constraint of installation space, the dummy power supply module generally has a specification, dimension and profile same as the real power supply module. But it has a cooling air fan installed inside to avoid affecting the airflow, vibration and mechanical strength of the entire structure. Its power comes from the real power supply module through electrically connecting to a power integration back panel. Moreover, as the power supply module has to equip with safety self-inspection function, after the dummy power supply module is connected to the power integration back panel, it also can output a Power Good (PG) signal.

In the condition in which the dummy power supply module and the real power supply module are used in a mixed manner, if malfunction occurs to either the dummy power supply module or the real power supply module, the controlling power integration back panel usually will generate a unusual alarm signal. But due to the dummy power supply module and the real power supply module are connected to the back panel through a connector of a standard specification (or a common panel), the monitor people at the remote end cannot distinguish from the alarm signal whether the malfunction occurs to the real power supply module or the dummy power supply module unless they actually go to where the backup-type power supply system is installed to do onsite inspection. Hence to the monitor people at the remote site who have to monitor many backup-type power supply systems, they cannot immediately confirm the safety factor of the backup-type power supply systems. This seriously affects risk management capability.

SUMMARY OF THE INVENTION

The primary object of the present invention is to solve the aforesaid disadvantages. The present invention provides a method to determine a real or a dummy power supply module by altering PG signal issue time and identifying PG signal delivery time difference sent by different power supply modules.

Another object of the invention is to provide a display means outside a backup-type power supply system to display installation conditions of the dummy power supply module and the real power supply module after the determination has been made.

Yet another object of the invention is to send installation condition signals of the dummy power supply module and the real power supply module to a remote monitor center through the Internet after the determination has been made.

DETAILED DESCRIPTION OF THE PREFERRED EMBODIMENT

Figure 1:
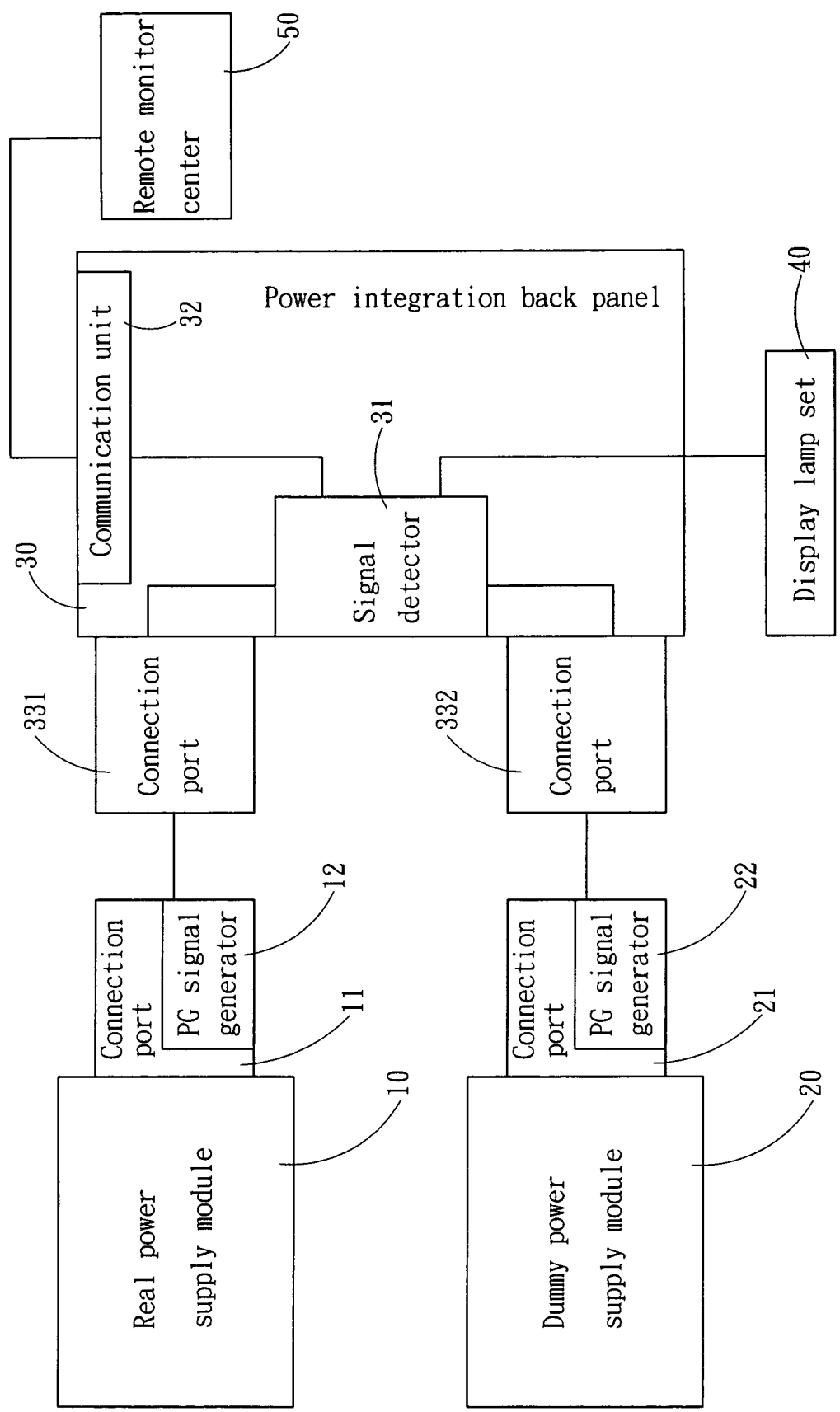
FIG. 1 is a schematic circuit block diagram of an embodiment of the present invention.
Figure 2:
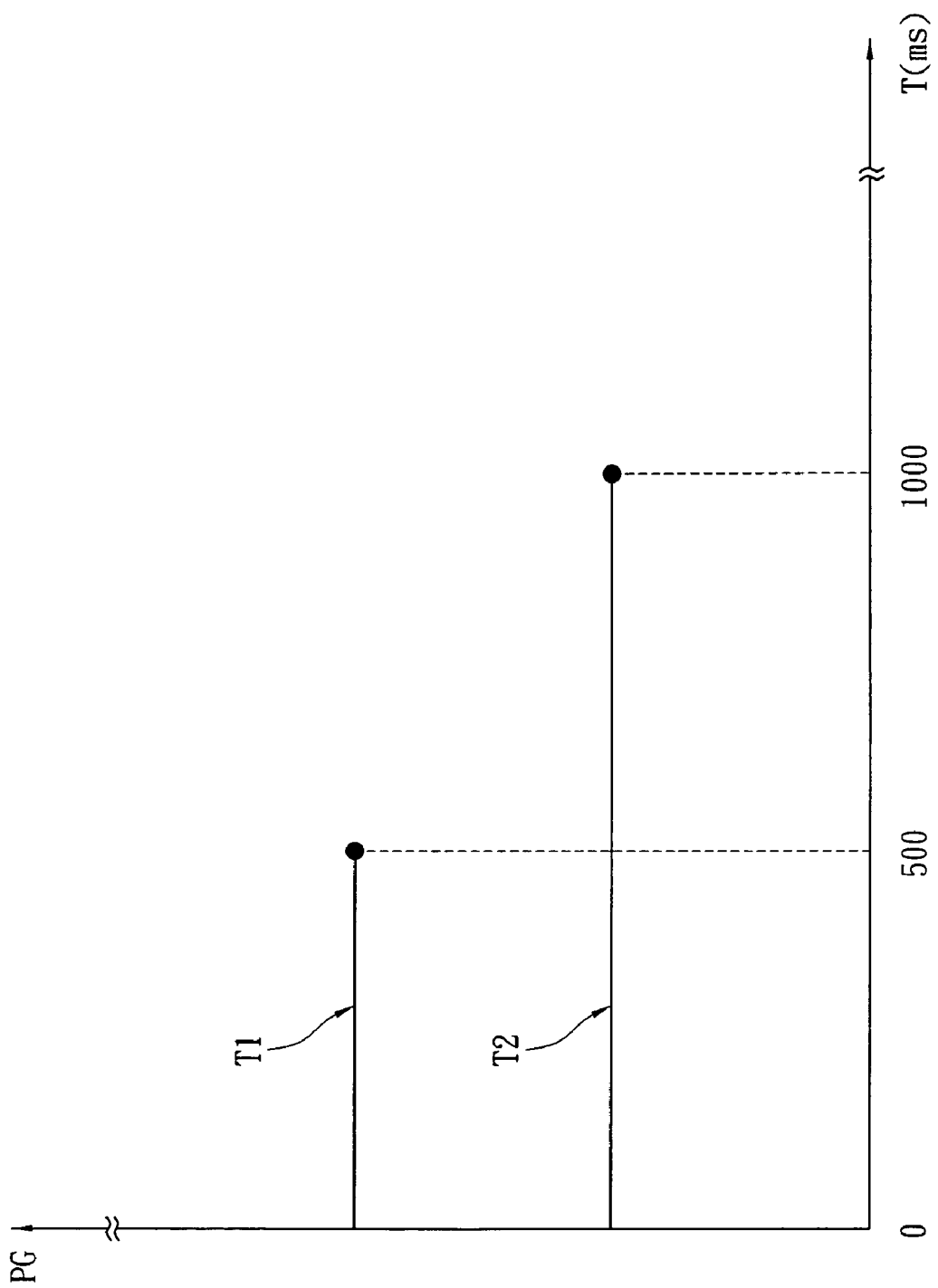
FIG. 2 is a schematic chart showing time sequence judgement according to the present invention.

Please refer to FIGS. 1 and 2 for the schematic circuit block diagram and the time sequence chart of an embodiment of the invention. The identifying method of the invention is adopted for use on a backup-type power supply system to aid identifying installation conditions of a real power supply module 10 and a dummy power supply module 20. The backup-type power supply system includes N+1 power supply modules and a power integration back panel 30 connecting to the power supply modules to integrate power output. The power supply modules include the real power supply module 10 and the dummy power supply module 20. In the circuit block diagram of the embodiment shown in FIG. 1, the real power supply module 10 and the power integration back panel 30 have respectively a connection port 11 and 331 that are connected electrically, and the dummy power supply module 20 and the power integration back panel 30 have respectively another connection port 21 and 332 that are connected electrically. The connection ports have respectively a PG signal generator 12 and 22. The power integration back panel 30 has a signal detector 31 (or a pin of a control unit on the power integration back panel 30) connecting to the PG signal generators 12 and 22. When the power supply of the backup-type power supply system is activated at a first time period T1 (preferably within the time sequence range of 500 ms), a first PG signal is issued, and the power supply module which delivers the first PG signal is marked as a first power supply module. After the first time period T1 and within a second time period T2 after the power supply is activated (preferably within the time sequence range of 1000 ms), a second PG signal is issued, and the power supply module which delivers the second PG signal is marked as a second power supply module. The signal detector receives the first and second PG signals generated by the PG signal generators 12 and 22 at different time sequences, and can determine the installation conditions of the real power supply module 10 and the dummy power supply module 20. A display means can be provided to receive and display the installation conditions of the real power supply module 10 and the dummy power supply module 20. The display means may be a display lamp set 40 located outside the backup-type power system, or a communication unit 32 installed on the power integration back panel 30. The communication unit 32 has a communication interface to transmit the identification signals to a remote monitor center 50. The communication interface may be selected from RS-232, RS-384 or I²C. The signal detector 31 may also be a communication interface to directly transmit the digitized identification signals of the installation conditions of the real power supply module 10 and the dummy power supply module 20 to the remote monitor center 50. Thereby the operators not only can clearly determine the installation conditions of the real power supply module 10 and the dummy power supply module 20 through the display lamp set 40 on spot without making mistaken judgement of the power safety factor due to look alike appearance of the real power supply module 10 and the dummy power supply module 20, they can also perform power risk management based on the clear understanding of the installation conditions of the real power supply module 10 and the dummy power supply module 20 through the communication interface at the remote communication center 50 without doing onsite inspection.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for identifying power supply modules to aid identification of installation conditions of a real power supply module and a dummy power supply module in a backup-type power supply system, comprising:

issuing a first power good (PG) signal generated by a first PG signal generator in a power supply module within a first time period after a backup-type power supply is activated;

issuing a second PG signal generated by a second PG signal generator in another power supply module within a second time period after the backup-type power supply is activated and the first time period;

receiving the first and second PG signals in a signal detector;

marking the power supply module that issues the first PG signal as a first power supply module; and marking another power supply module that issues the second PG signal as a second power supply module.

2. The method of claim 1, wherein the first power supply module is the real power supply module.

3. The method of claim 2, wherein the second power supply module is the dummy power supply module.

4. The method of claim 1, wherein the first power supply module is the dummy power supply module.

5. The method of claim 4, wherein the second power supply module is the real power supply module.

6. The method of claim 1, wherein the first time period is within 500 ms after the power supply is activated.

7. The method of claim 1, wherein the second time period is within 1000 ms after the power supply is activated.

8. An identification method of the backup-type power supply system of claim 1 further having a display means to display the installation conditions of the real power supply module and the dummy power supply module.

9. The identification method of claim 8, wherein the display means is a display lamp set located outside the backup-type power supply system.

10. The identification method of claim 9, wherein the display means has a communication unit which has a communication interface to transmit the installation conditions of the real power supply module and the dummy power supply module to a remote monitor center.

11. The identification method of claim 10, wherein the communication interface is selected from the group consisting of RS-232, RS-384 and I²C.

12. The identification method of claim 8, wherein the display means has a communication unit which has a communication interface to transmit the installation conditions of the real power supply module and the dummy power supply module to a remote monitor center.

13. The identification method of claim 12, wherein the communication interface is selected from the group consisting of RS-232, RS-384 and I²C.

* * * * *